Figure 1:
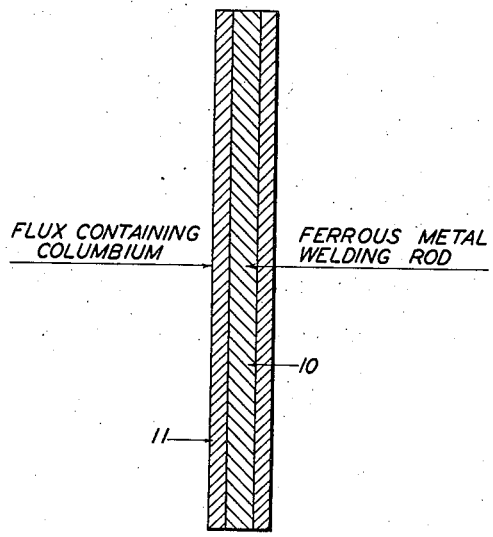

Dec. 27, 1938.   C. G. CHADWICK   2,142,045
FLUX COATED WELDING ROD
Original Filed Aug. 1, 1934

INVENTOR
CECIL G. CHADWICK
BY
ATTORNEY

Patented Dec. 27, 1938

2,142,045

UNITED STATES PATENT OFFICE 2,142,045

FLUX COATED WELDING ROD

Cecil G. Chadwick, West New York, N. J., assignor to Oxweld Acetylene Company, a corporation of West Virginia Original application August 1, 1934, Serial No. 737,899. Divided and this application January 25, 1938, Serial No. 186,765

3 Claims. (Cl. 219—8)

The invention relates to welding and more particularly to flux-coated welding rods. This application is a division of my application Serial No. 737,899, filed August 1, 1934.

It is known that the addition of columbium imparts desirable and valuable properties to certain metals and alloys, and is particularly useful in improving the welding characteristics of these metals and alloys. For example, chromium steels containing about 2% to about 16% chromium and moderate amounts of carbon are strongly air-hardening, and welds made with this material are ordinarily very brittle. Likewise, chromium steels containing about 16% to about 35% chromium and moderate amounts of carbon lack satisfactory ductility in the welded state. Further, chromium-nickel steels containing say 12% to 35% chromium, 6% to 35% nickel, and up to about 0.3% carbon tend when welded to lose a substantial part of their resistance to corrosion.

It has heretofore been proposed to improve the welding characteristics of the above mentioned steels by adding columbium to the metal to be welded and to the welding rod. Although good results have been obtained in this way, metal containing columbium tends to lose part of its content of this element during welding operations. In many instances it is neither economical nor metallurgical advisable to provide sufficient columbium in the base metal and/or welding rod metal to insure the presence of satisfactory amounts of columbium in the completed weld, and it is an object of the present invention to provide a more flexible way of dealing with the problem.

The invention is a welding rod, for welding steels containing more than 2% chromium to produce welds substantially free from non-metallic inclusions and soluble carbides, comprising a ferrous metal body containing about 2% to 35% chromium, up to about 0.3% carbon, and the remainder chiefly iron, such body having thereon a welding flux containing columbium, preferably in the form of finely comminuted ferro-columbium. Slag forming materials, for example, silicon, silica, silicates, metal oxides, metal carbonates, and borax, and/or a binder, for example a soluble silicate or silicon ester, may also be incorporated in the flux. Although the proportions to be used are not critical, it is recommended that the columbium content be about 5% to about 40% of the flux composition, but as little as two or three percentum columbium is useful and within the invention. A flux composition which I have found experimentally to be entirely satisfactory contains:

| | Parts by weight |
|---|---|
| Columbium as ferrocolumbium | about 5 to 30 |
| Feldspar | about 30 |
| Calcium carbonate | about 10 |
| Chrome ore | about 5 |

The loss of columbium during welding may be decreased if silicon or aluminum is added to the flux.

Figure 2:
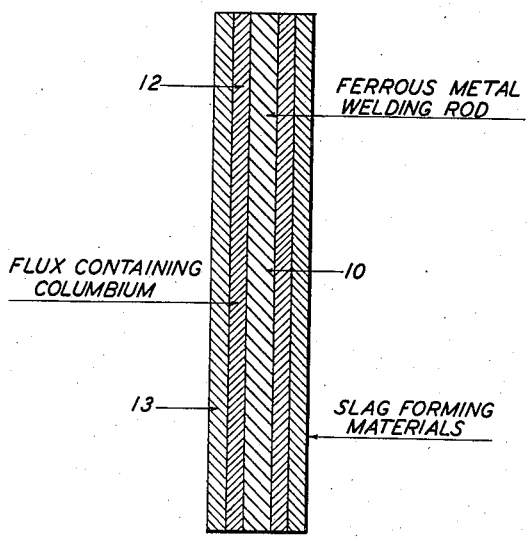

Suitable forms of coated welding rods are shown in the accompanying drawing, in which Figure 1 is a cross sectional view of a welding rod 10 and of a flux coat 11 containing columbium and slag forming materials, and Figure 2 is a cross sectional view of a welding rod 10, of a flux coat 12 containing columbium, and of a second flux coat 13 containing slag forming materials.

The flux may be attached to the rod by forming an adhesive paste or adhesive glaze containing the flux, in which case the structure shown in Figure 1 is obtained; by placing a layer of flux next to the rod and covering this layer with an adhesive paste or glaze, obtaining the structure shown in Figure 2; or by holding the flux onto the rod by a fabric sheath in known manner.

Experiments have demonstrated the advantages of the invention. In certain of these experiments, a ferrocolumbium alloy containing approximately 62.5% columbium, 7% silicon, 2% manganese, 0.33% carbon, 1.64% tantalum, remainder substantially all iron, was ground to pass about 100 mesh (about 0.15 mm. screen opening), and mixed with slag forming materials containing feldspar, calcium carbonate, and chrome ore. Mixtures containing respectively about 13%, 22%, and 32.4% by weight of columbium were prepared and applied as coats to welding rods. Each rod so coated was then deposited by electric arc welding, and the deposit analyzed, the analysis being then compared to that of metal deposited under identical conditions without the use of the columbium-containing flux. The results of these experiments are contained in the following table:

| Composition of welding rod | | | | Percent columbium in flux | Percent columbium in weld metal |
|---|---|---|---|---|---|
| Percent Cr | Percent Ni | Percent C | Percent Cb | | |
| 6.34 | Nil | 0.07 | 1.55 | None | 0.95 |
| 6.34 | Nil | .07 | 1.55 | 13.3 | 1.35 |
| 6.34 | Nil | .07 | 1.55 | 21.9 | 1.89 |
| 6.34 | Nil | .07 | 1.55 | 32.4 | 2.30 |
| 18.39 | 8.95 | .06 | .72 | None | .28 |
| 18.39 | 8.95 | .06 | .72 | 13.3 | .64 |
| 18.39 | 8.95 | .06 | .72 | 21.9 | 1.19 |
| 18.39 | 8.95 | .06 | .72 | 32.4 | 2.17 |

The results obtainable by the use of the flux of the invention in oxyacetylene flame welding are at least as good as those indicated above.

The results of these tests demonstrate the effectiveness of the flux of the invention to introduce columbium into the weld metal. The welds obtained when the flux is used on steels containing about 2% to 35% chromium are surprisingly ductile and strong, and those obtained on the 18-8 type chromium-nickel steels are extremely resistant to corrosion.

All proportions and percentages mentioned herein and in the appended claims are by weight. Although specific embodiments of the invention have been described in detail herein, it will be readily understood that such embodiments are presented merely as examples, and that the invention is not limited to or by them except as required by the state of the art.

I claim:

1. A welding rod, for welding steels containing more than 2% chromium to produce welds substantially free from non-metallic inclusions and soluble carbides, comprising a ferrous metal body containing about 2% to 35% chromium, carbon in an amount not exceeding 0.3%, and the remander chiefly iron; and a flux coat on said body, such flux coat containing a substantial proportion of columbium in the metallic state, silicon, and a slag forming material composed of feldspar and calcium carbonate, the columbium forming about 10% to 40% of the flux coat.

2. A welding rod as defined in claim 1 wherein the slag forming material includes chrome ore.

3. A welding rod as defined in claim 1 wherein the slag forming material has approximately the composition in parts by weight: feldspar 6 parts; calcium carbonate 2 parts; chrome ore 1 part.

CECIL G. CHADWICK.